(12) United States Patent
Zhang et al.

(10) Patent No.: US 8,102,828 B2
(45) Date of Patent: Jan. 24, 2012

(54) METHOD AND SYSTEM FOR ESTABLISHING TUNNEL IN WLAN

(75) Inventors: Peng Zhang, Shenzhen (CN); Wenlin Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 776 days.

(21) Appl. No.: 12/176,077

(22) Filed: Jul. 18, 2008

(65) Prior Publication Data
US 2008/0298312 A1   Dec. 4, 2008

Related U.S. Application Data

(63) Continuation of application No. PCT/CN2007/000195, filed on Jan. 18, 2007.

(30) Foreign Application Priority Data

Jan. 20, 2006 (CN) .......................... 2006 1 0001651

(51) Int. Cl.
*H04W 4/00* (2009.01)
(52) U.S. Cl. ........................................ 370/338; 455/445
(58) Field of Classification Search .................. 370/338; 455/445, 561
See application file for complete search history.

(56) References Cited

U.S. PATENT DOCUMENTS

| | | | |
|---|---|---|---|
| RE39,990 E * | 1/2008 | Shalem et al. | 455/445 |
| 2005/0063381 A1 * | 3/2005 | Kayalackakom et al. | 370/389 |
| 2006/0104234 A1 | 5/2006 | Zhang | |
| 2006/0104252 A1 * | 5/2006 | Song et al. | 370/338 |
| 2007/0157305 A1 * | 7/2007 | Dajiang | 726/14 |

FOREIGN PATENT DOCUMENTS

| | | |
|---|---|---|
| CN | 1612539 A | 4/2005 |
| CN | 1627753 A | 6/2005 |

OTHER PUBLICATIONS

Written Opinion of the International Searching Authority in corresponding PCT Application No. PCT/CN2007/000195 (Apr. 26, 2007).

Kent et al., "RFC 2401 - Security Architecture for the Internet Protocol," Internet Society, Nov. 1998, Reston, Virginia.

(Continued)

*Primary Examiner* — Ricky Ngo
*Assistant Examiner* — Richard K Chang
(74) *Attorney, Agent, or Firm* — Leydig, Voit & Mayer, Ltd.

(57) ABSTRACT

A method and a system for establishing a tunnel in a wireless local area network (WLAN) are described. The method includes the following steps. A WLAN terminal initiates a tunnel establishment request in an Internet Key Exchange Security Association (IKE SA) that has been established. It is judged whether the number of tunnels already established in the IKE SA reaches a corresponding first threshold or not, if the number of tunnels does not reach the corresponding first threshold, establishing the tunnel for the WLAN terminal; otherwise, rejecting the establishment of the tunnel for the WALN terminal. It is decided whether to establish the tunnel for the WLAN terminal or not by judging whether the number of the tunnels already established in each IKE SA reaches the corresponding threshold or not during the tunnel establishment of the WLAN terminal, thereby effectively controlling the rationality and validity about the tunnel establishment.

12 Claims, 6 Drawing Sheets

OTHER PUBLICATIONS

"3GPP TS 24.234 - 3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 6)," Dec. 2005, Version 6.5.0, 3rd Generation Partnership Project, Valbonne, France.

"3GPP TS 24.234 - 3rd Generation Partnership Project; Technical Specification Group Core Network and Terminals; 3GPP System to Wireless Local Area Network (WLAN) interworking; User Equipment (UE) to network protocols; Stage 3 (Release 7)," Dec. 2005, Version 7.0.0, 3rd Generation Partnership Project, Valbonne, France.

* cited by examiner

METHOD AND SYSTEM FOR ESTABLISHING TUNNEL IN WLAN

CROSS-REFERENCE TO RELATED APPLICATIONS

This application is a continuation of International Patent Application No. PCT/CN2007/000195, filed Jan. 18, 2007, which claims priority to Chinese Patent Application No. 200610001651.8, filed Jan. 20, 2006, entitled "Method and System for Establishing Tunnel in WLAN," both of which are hereby incorporated by reference in their entirety.

FIELD OF TUBE INVENTION

The present invention relates to the communication field, and more particularly to a method and a system for establishing a tunnel in a wireless local area network.

BACKGROUND

As the user's requirement on the wireless access rate is increasingly higher, wireless local area network (WLAN) has emerged, which can provide high-speed wireless data access in a small area. The WLAN includes many different technologies, among which a widely applied technical standard is IEEE 802.11b that adopts a frequency band of 2.4 GHz and has the highest data transmission rate up to 11 Mbps. IEEE 802.11g and Bluetooth technology also adopt this frequency band, and the highest data transmission rate of IEEE 802.11g can be as high as 54 Mbps. Other new technologies such as IEEE 802.11a and ETSI BRAN Hiperlan2 all adopt a frequency band of 5 GHz, and the highest transmission rate thereof can also reach as high as 54 Mbps.

Although there are many different wireless access technologies, most WLAN are used to transmit Internet Protocol (IP) data packets. As for a wireless IP network, the specific WLAN access technology adopted is generally transparent to the upper IP layer. In a basic structure of the wireless IP network, a wireless access of a user terminal is realized through an access point (AP), and network control and connection equipments are connected to constitute an IP transmission network.

Figure 2:
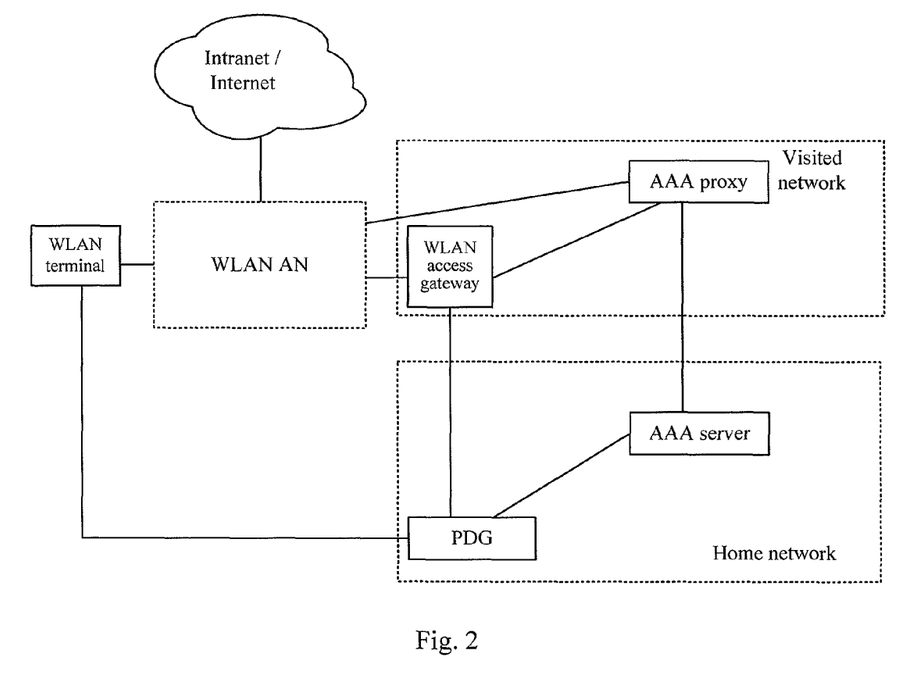
FIG. 2 is a schematic structural view of the intercommunication system in a roaring state.
Figure 3:
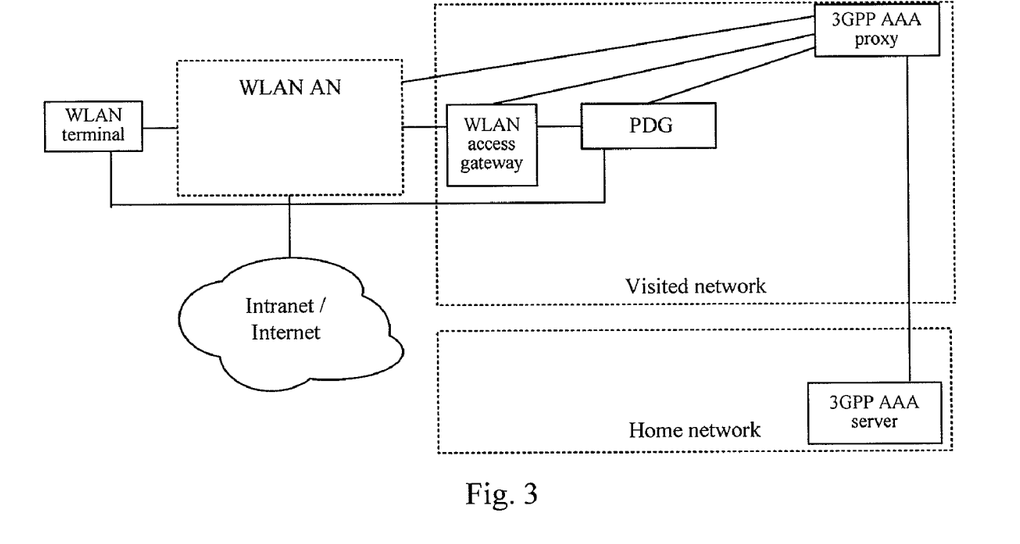
FIG. 3 is a schematic structural view of another intercommunication system in a roaming state.

With the rising and development of the WLAN technology, an intercommunication between the WLAN and various wireless mobile communication networks such as a global system for mobile communications (GSM), code division multiple access (CDMA), wide-band code division multiple access (WCDMA), time division-synchronous code division multiple access (TD-SCDMA), and CDMA2000 system has become a focus for the current research. In the current universal mobile telecommunication system (UMTS), the user terminal may be connected to the Internet or Intranet through a WLAN access network (AN), or connected to a home network or a visited network of the user through the WLAN AN. Specifically speaking, in the local access, the WLAN user terminal is connected to the home network of the user through the WLAN AN; in a roaming state, the WLAN user terminal is connected to the visited network of the user through the WLAN AN. Some of the entities in the visited network are respectively interconnected with corresponding entities in the home network, for example, an authentication, authorization, and accounting (AAA) proxy in the visited network and an AAA Server in the home network; a WLAN access gateway (WAG) in the visited network and a packet data gateway (PDG) in the home network, and so on. Structural views of an intercommunication system are shown in FIGS. 1, 2, and 3.

Figure 1:
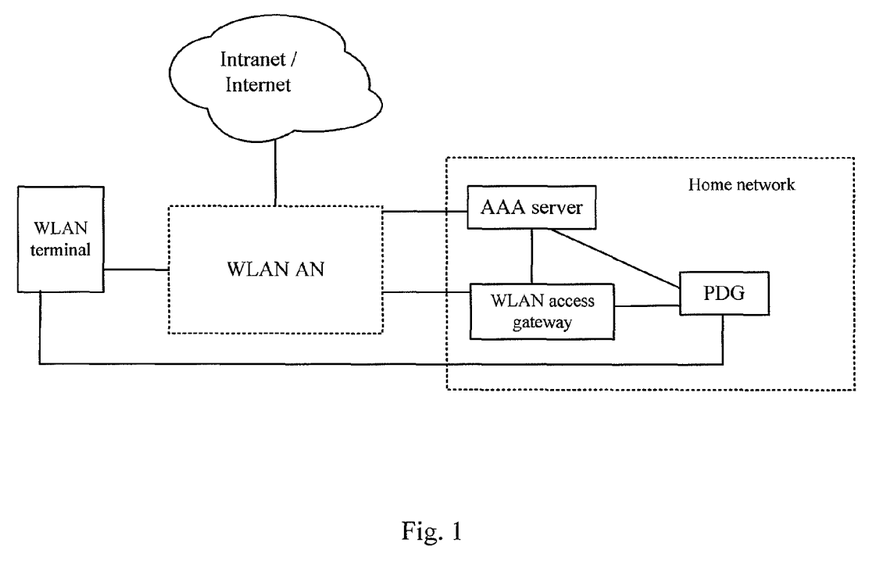
FIG. 1 is a schematic structural view of an intercommunication system in a non-roaring state.

FIG. 1 is a schematic structural view of an intercommunication system in a non-roaming state. FIG. 2 is a schematic structural view of the intercommunication system in a roaming state. FIG. 3 is a schematic structural view of another intercommunication system in a roaming state.

Figure 4:
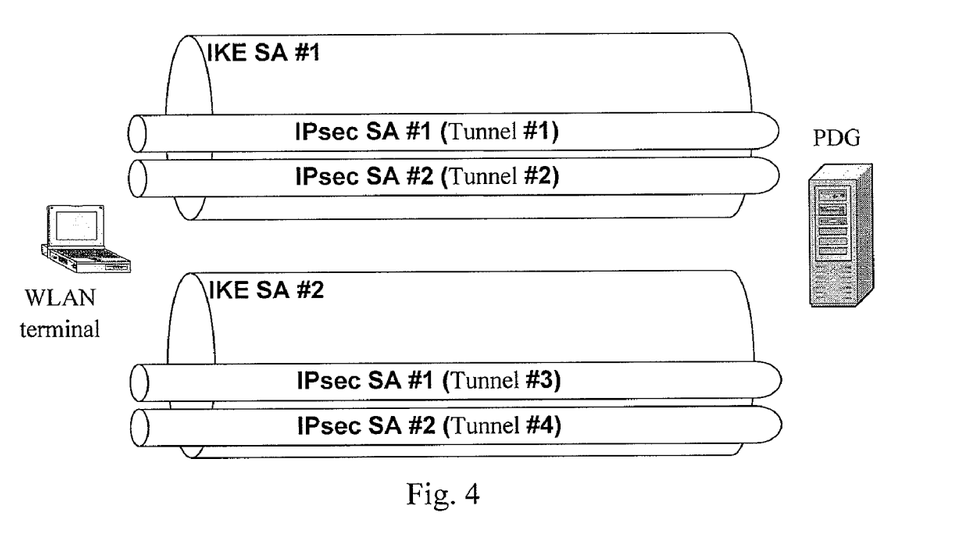
FIG. 4 is a schematic view of a relation between an IKE SA and an IPsecSA.

The PDG plays an important role in the intercommunication system, which is a gateway for the data exchange between a WLAN user equipment (UE) and an external network, functions to control and manage the user data, and meanwhile generates accounting information. The communication between the WLAN UE and the PDG adopts an IPsec-based tunnel. The tunnel between the WLAN UE and the PDG is actually a two-layer logic relation. The information between the WLAN UE and the PDG for tunnel establishment and encryption is guaranteed by an Internet Key Exchange Security Association (IKE SA) established through an Internet Key Exchange version 2 (IKEv2) protocol. One or more IP security protocol-security associations (IPsec SAs) may be established in each IKE SA. Each IPsec SA is one tunnel. The relation between the IKE SA and the IPsec SA may be simply represented in FIG. 4.

In order to control the number of tunnels established for the user, two parameters are defined in the current specification: one is Max number of IPsec SA (I-WLAN tunnels) per IKE configured on the PDG by an operator, which limits the maximum number of tunnels established in each IKE SA; the other is per user count, which is adapted to count a total number of tunnels currently established for the user.

Figure 5:
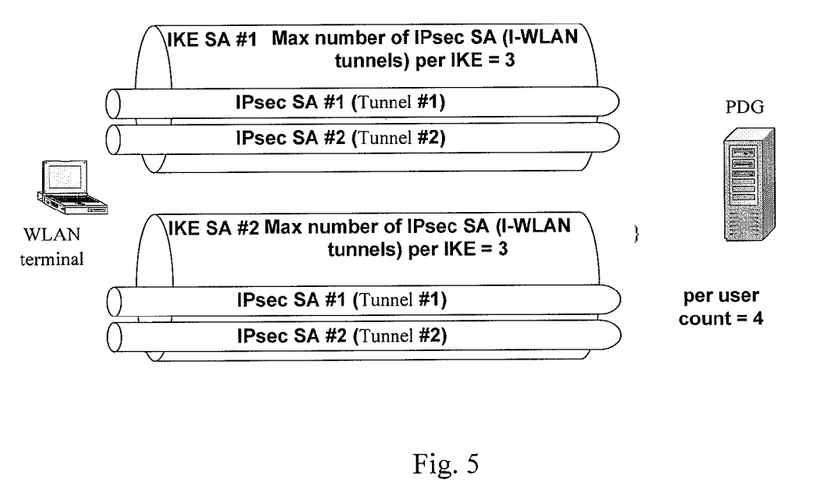
FIG. 5 is a schematic view of another relation between the IKE SA and the IpsecSA.

In the above solution, it is decided whether to allow the user to establish more tunnels or not by comparing the parameter of Max number of IPsec SA (I-WLAN tunnels) per IKE with the per user count. For example, if the per user count is larger than the parameter of Max number of IPsec SA (I-WLAN tunnels) per IKE, the user is not allowed to establish more tunnels; otherwise, the user is allowed to establish more tunnels. However, the problem lies in that the parameter of Max number of IPsec SA (I-WLAN tunnels) per IKE and the per user count are not parameters at the same level. For example, as shown in FIG. 5, the parameter of Max number of IPsec SA (I-WLAN tunnels) per IKE configured on the PDG is 3, which means that at most 3 tunnels can be established in each IKE SA. As shown in FIG. 5, two IKE SAs are established between the WLAN UE and the PDG, and two tunnels (IPsec SAs) are established in each IKE SA. At this time, the per user count is 4, which is larger than the Max number of IPsec SA (I-WLAN tunnels) per IKE. If the user requests to establish one more tunnel at this time, the user will be rejected, because 4>3. However, the request for establishing one more tunnel should not be prohibited, because the number of tunnels in each IKE SA is actually 2, which is less than 3. Therefore, setting only one per user count is far from enough.

SUMMARY

The embodiments of the present invention provide a method and a system for establishing a tunnel in a WLAN, so as to solve the problems in the prior art that the technical solution for establishing a tunnel for a WLAN terminal needs to be improved and the tunnel establishment process can not be effectively controlled.

The embodiments of the present invention include the following methods.

A method for establishing a tunnel in a WLAN includes the following steps.

A WLAN terminal initiates a tunnel establishment request in an Internet Key Exchange Security Association (IKE SA) that has been established.

It is judged whether the number of tunnels already established in the IKE SA reaches a corresponding first threshold or not. If the number of tunnels does not reach the corresponding first threshold, the tunnel for the WLAN terminal is established; otherwise, the establishment of the tunnel for the WALN terminal is rejected.

A method for establishing a tunnel in a WLAN includes the following steps.

A WLAN terminal initiates a tunnel establishment request in an IKE SA that has been established.

It is judged whether the number of tunnels already established for the WLAN terminal reaches a second threshold corresponding to the number of tunnels established for the WLAN terminal or not If the number of tunnels does not reach the second threshold, the tunnel for the WLAN terminal is established; otherwise, the establishment of the tunnel for the WALN terminal is rejected.

The embodiments of the present invention include the following systems.

A system for establishing a tunnel in a WLAN includes: a WLAN terminal, a WLAN access network (AN) adapted to provide access for the WLAN terminal, and a tunnel establishment unit adapted to establish the tunnel for the WLAN terminal.

The tunnel establishment unit is provided with a first threshold storage unit adapted to store a first threshold corresponding to the number of tunnels established in an IKE SA. When the WLAN terminal initiates a tunnel establishment request, the tunnel establishment unit queries the first threshold storage unit to obtain the first threshold and decides whether to establish the tunnel for the WLAN terminal or not according to whether the number of tunnels already established in each IKE SA reaches the first threshold or not.

A system for establishing a tunnel in a WLAN includes: a WLAN terminal, a WLAN AN adapted to provide access for the WLAN terminal, and a tunnel establishment unit adapted to establish the tunnel for the WLAN terminal.

The tunnel establishment unit is provided with a second threshold storage unit adapted to store a second threshold corresponding to the number of tunnels established for the WLAN terminal. When the WLAN terminal initiates a tunnel establishment request, the tunnel establishment unit queries the second threshold storage unit to obtain the second threshold and decides whether to establish the tunnel for the WLAN terminal or not according to whether the number of tunnels already established for the WLAN terminal reaches the second threshold or not.

In the embodiments of the present invention, through the method and system for establishing the tunnel in the WLAN, it is decided whether to establish the tunnel for the WLAN terminal or not by judging whether the number of the tunnels already established in each IKE SA reaches the corresponding first threshold or not and/or judging whether the number of the tunnels already established for the WLAN terminal reaches the second threshold corresponding to the number of the tunnels established for the WLAN terminal or not during the tunnel establishment of the WLAN terminal, thereby effectively controlling the rationality and validity about the tunnel establishment.

DETAILED DESCRIPTION

The specific implementations of the present invention are described below with reference to the accompanying drawings in the specification.

In the embodiments of the present invention, a tunnel establishment unit adapted to allocate a tunnel for a WLAN UE may be a PDG, an AAA server, or another network element with the same function, which may be equally substituted in the following solutions without influencing the implementation of the present invention.

First Embodiment

Figure 6:
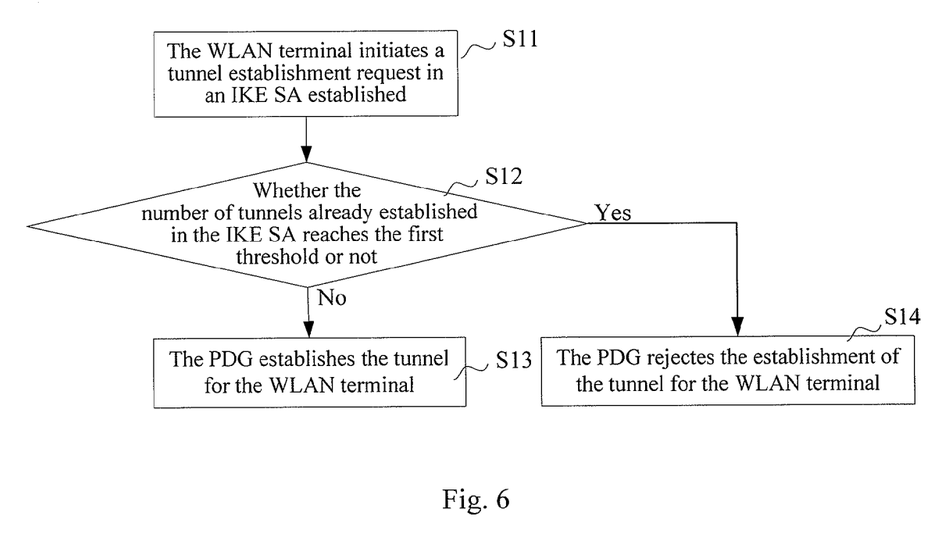
FIG. 6 is a schematic flow chart of a first embodiment of the present invention.

A first threshold for the number of tunnels established in an IKE SA is preset in a PDG. When a WLAN UE initiates a tunnel establishment request, it is decided whether to allocate a tunnel for the WLAN UE or not according to whether the number of tunnels already established in the IKE SA reaches the first threshold or not. As shown in FIG. 6, the flow includes the following steps.

S11, the WLAN UE initiates a tunnel establishment request in an IKE SA that has been established.

S12, the PDG judges whether the number of tunnels already established in the IKE SA reaches the preset first threshold corresponding to the number of tunnels established in the IKE SA or not, and if the number does not reach the preset first threshold, the flow proceeds to step S13; otherwise, the flow proceeds to step S14.

S13, the PDG establishes the tunnel for the WLAN UE.

The PDG sends a tunnel establishment response to the WLAN UE, which accepts the tunnel establishment request from the WLAN UE and adds 1 to a counter for the tunnels in the IKE.

S14, the establishment of the tunnel for the WLAN UE is rejected.

In this step, the number of the tunnels already established in the IKE SA may be obtained by counting through a preset first counter.

In this flow, if the number of the tunnels already established in the IKE SA is smaller than the preset first threshold for the number of the tunnels established in the IKE SA, it indicates that the IKE SA can further establish more tunnels. If the number of the tunnels already established in the IKE SA is equal to the preset first threshold for the number of the tunnels established in the IKE SA, it indicates that the number of the tunnels established in the IKE SA has been saturated, and the IKE SA can not establish any new tunnel.

In the first embodiment, the PDG judges whether the number of the tunnels already established in the IKE SA reaches the preset first threshold for the number of the tunnels established in the IKE SA or not, and decides whether to accept the tunnel establishment request from the WLAN UE and allocate the tunnel for the WLAN UE or not according to a judgment result.

Figure 7:
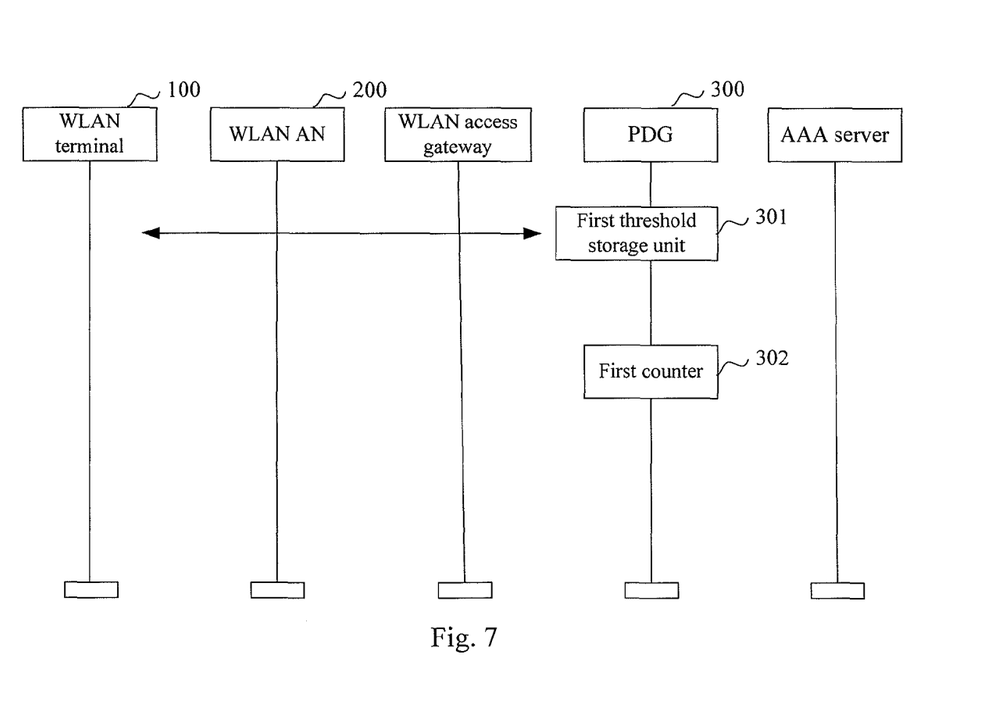
FIG. 7 is a schematic structural view of a system according to the first embodiment of the present invention.

FIG. 7 is a schematic structural view of a system directed to such a solution. Referring to FIG. 7, the system includes: a WLAN UE 100, a WLAN AN 200 adapted to provide access for the WLAN UE 100, and a PDG 300 adapted to establish a tunnel for the WLAN UE 100.

In the system, the PDG 300 is provided with a first threshold storage unit 301 adapted to store a first threshold corresponding to the number of tunnels established in an IKE SA. When the WLAN UE 100 initiates a tunnel establishment request in an IKE SA that has been established, the PDG 300 queries the first threshold storage unit 301 to obtain the first threshold and decides whether to establish the tunnel for the WLAN UE 100 or not according to whether the number of tunnels already established in the IKE SA reaches the first threshold or not.

The PDG 300 may further include a first counter 302 adapted to count the number of the tunnels already established in each IKE SA.

Second Embodiment

Figure 8:
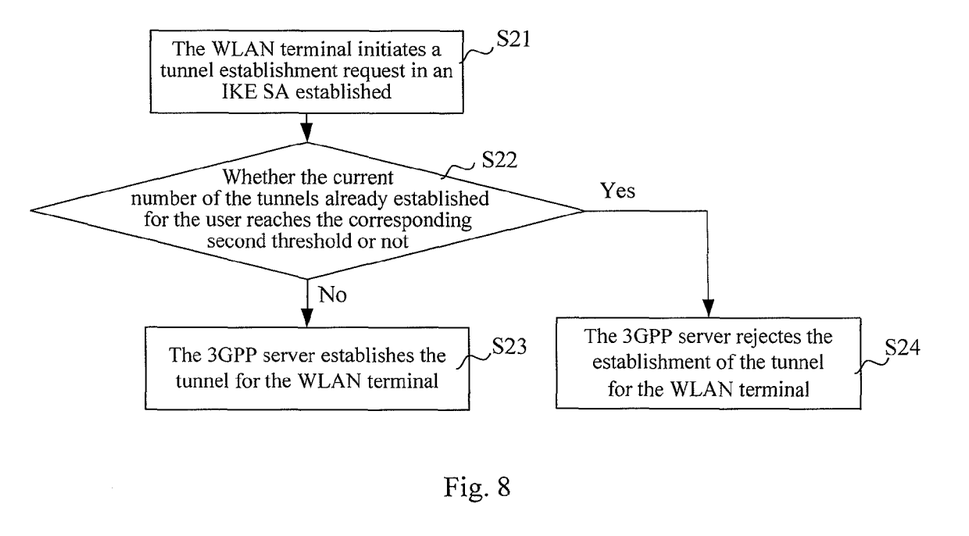
FIG. 8 is a schematic flow chart of a second embodiment of the present invention.

A second threshold for the number of tunnels currently established for a user is preset in an AAA server. When a WLAN UE initiates a tunnel establishment request, it is decided whether to allocate a tunnel for the WLAN UE or not according to whether the current number of tunnels already established for the user reaches the second threshold or not. As shown in FIG. 8, the flow includes the following steps.

S21, the WLAN UE initiates a tunnel establishment request in an IKE SA that has been established.

S22, the AAA server judges whether the current number of tunnels already established for the user reaches the corresponding second threshold or not, and if the current number does not reach the corresponding second threshold, the flow proceeds to step S23; otherwise, the flow proceeds to step S24.

In this step, the current number of the tunnels already established for the user may be obtained by counting through a preset second counter.

S23, the AAA server establishes the tunnel for the WLAN UE.

The 3GPP AAA server sends a tunnel establishment response to the WLAN UE (possibly forwarded through a PDG), which accepts the tunnel establishment request from the WLAN UE and adds 1 to a counter for the tunnels that currently have been established for the user.

S24, the establishment of the tunnel for the WLAN UE is rejected.

In the second embodiment, the AAA server judges whether the current number of the tunnels already established for the user reaches the corresponding second threshold or not, and decides whether to accept the tunnel establishment request from the WLAN UE and allocate the tunnel for the WLAN UE or not according to a judgment result.

Figure 9:
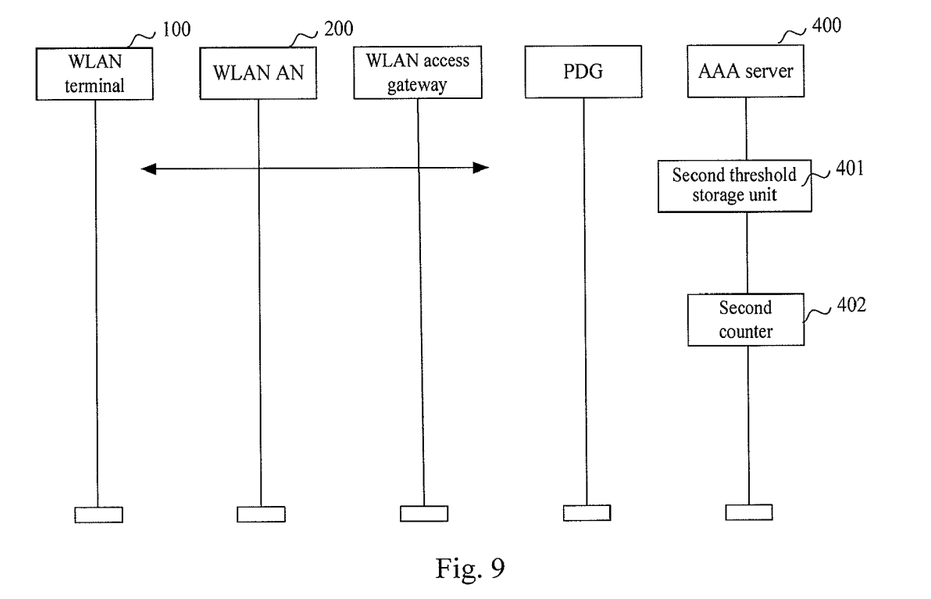
FIG. 9 is a schematic structural view of a system according to the second embodiment of the present invention.

FIG. 9 is a schematic structural view of a system directed to such a solution. Referring to FIG. 9, the system includes: a WLAN UE 100, a WLAN AN 200 adapted to provide access for the WLAN UE 100, and an AAA server 400 adapted to establish a tunnel for the WLAN UE 100.

In the system, the AAA server 400 is further provided with a second threshold storage unit 401 adapted to store a second threshold for the current number of tunnels established for a user. When the WLAN UE 100 initiates a tunnel establishment request, the AAA server 400 queries the second threshold storage unit 401 to obtain the second threshold and decides whether to establish the tunnel for the WLAN UE 100 or not according to whether the current number of tunnels already established for the user reaches the second threshold or not.

The AAA server 400 may further include a second counter 402 adapted to count the current number of the tunnels already established for the user.

Third Embodiment

Figure 10:
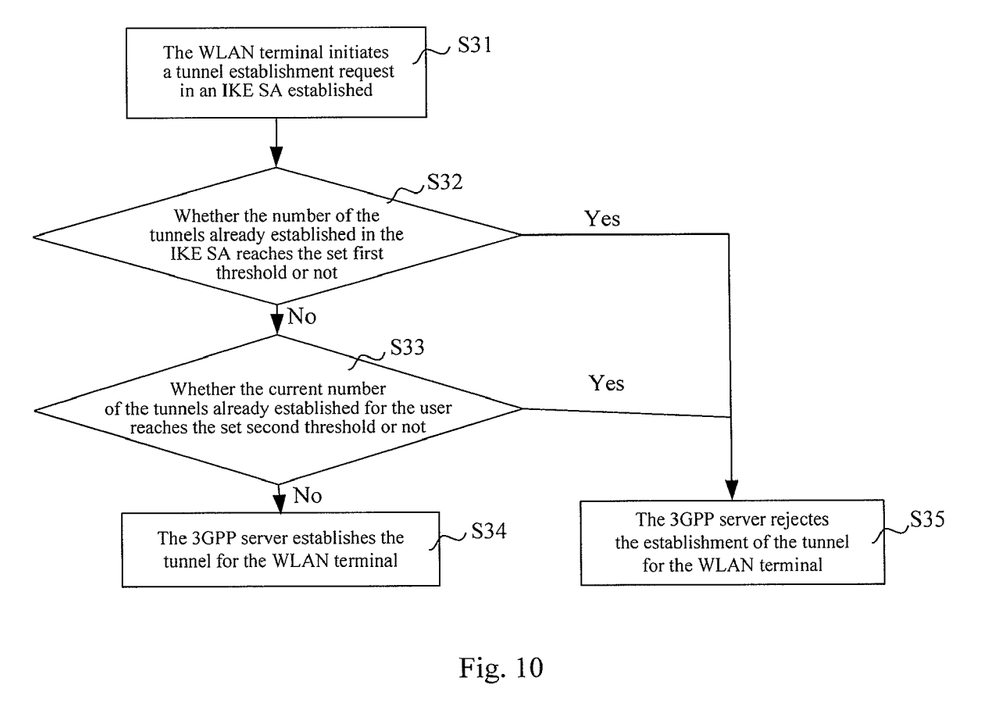
FIG. 10 is a schematic flow chart of a third embodiment of the present invention.

A first threshold for the number of tunnels established in an IKE SA and a second threshold for the current number of tunnels established for a user are preset in a PDG. When a WLAN UE initiates a tunnel establishment request, it is decided whether to allocate a tunnel for the WLAN UE or not according to whether the number of tunnels already established in each IKE SA reaches the first threshold and whether the current number of tunnels already established for the user reaches the second threshold or not. As shown in FIG. 10, the flow includes the following steps.

S31, the WLAN UE initiates a tunnel establishment request in an IKE SA that has been established.

S32, the PDG judges whether the number of tunnels already established in the IKE SA reaches the preset first threshold corresponding to the number of the tunnels established in the IKE SA or not, and if the number of tunnels does not reach the preset first threshold, the flow proceeds to step S33; otherwise, the flow proceeds to step S35.

S33, the PDG judges whether the current number of tunnels already established for the user reaches the corresponding second threshold or not, and if the current number of tunnels does not reach the corresponding second threshold, the flow proceeds to step S34; otherwise, the flow proceeds to step S35.

S34, the PDG establishes the tunnel for the WLAN UE.

The PDG sends a tunnel establishment response to the WLAN UE, which accepts the tunnel establishment request from the WLAN UE and adds 1 to a counter for the tunnels in the IKE.

S35, the establishment of the tunnel for the WLAN UE is rejected.

In the third embodiment, the PDG judges whether the number of the tunnels already established in the IKE SA reaches the preset first threshold for the number of the tunnels established in the IKE SA or not, judges whether the current number of the tunnels already established for the user reaches the corresponding second threshold or not, and decides whether to accept the tunnel establishment request from the WLAN UE and allocate the tunnel for the WLAN UE or not according to judgment results.

Figure 11:
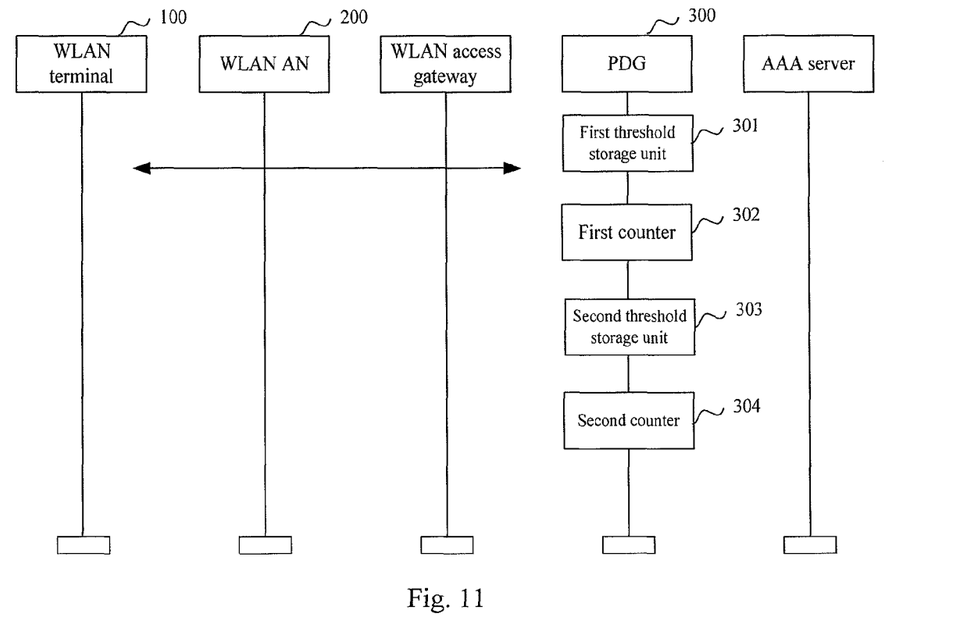
FIG. 11 is a schematic structural view of a system according to the third embodiment of the present invention.

FIG. 11 is a schematic structural view of a system directed to such a solution. Referring to FIG. 11, the system includes: a WLAN UE 100, a WLAN AN 200 adapted to provide access for the WLAN UE 100, and a PDG 300 adapted to establish a tunnel for the WLAN UE 100.

In the system, the PDG 300 is further provided with a first threshold storage unit 301.

The first threshold storage unit 301 is adapted to store a first threshold corresponding to the number of tunnels established in an IKE SA. When the WLAN UE 100 initiates a tunnel establishment request, the PDG 300 queries the first threshold storage unit 301 to obtain the first threshold and decides whether to establish the tunnel for the WLAN UE 100 or not according to whether the number of tunnels already established in the IKE SA reaches the first threshold or not.

In the system, the PDG 300 is further provided with a second threshold storage unit 303 adapted to store a second threshold for the current number of tunnels established for a user. When the WLAN UE 100 initiates a tunnel establishment request, the PDG 300 queries the second threshold storage unit 303 to obtain the second threshold and decides whether to establish the tunnel for the WLAN UE 100 or not according to whether the current number of tunnels already established for the user reaches the second threshold or not.

The PDG 300 further includes a first counter 302 and a second counter 304.

The first counter 302 is adapted to count the number of the tunnels already established in the IKE SA.

The second counter 304 is adapted to count the current number of the tunnels already established for the user.

Fourth Embodiment

A first threshold for the number of tunnels established in an IKE SA and a second threshold for the current number of tunnels established for a user are preset in a PDG. When a WLAN UE initiates a tunnel establishment request, it is decided whether to allocate a tunnel for the WLAN UE or not according to whether the current number of tunnels already established for the user reaches the second threshold and whether the number of tunnels already established in each IKE SA reaches the first threshold or not. As shown in FIG. 10, the flow includes the following steps.

Figure 12:
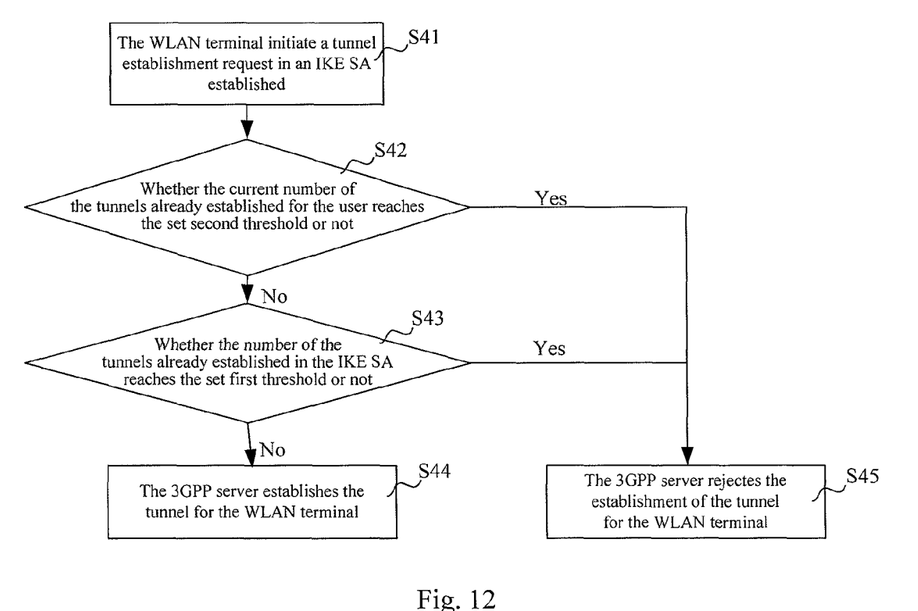
FIG. 12 is a schematic flow chart of a fourth embodiment of the present invention.

S41, the WLAN UE initiates a tunnel establishment request in an IKE SA that has been established.

S42, the PDG judges whether the current number of the tunnels already established for the user reaches the second threshold or not, and if the current number does not reach the second threshold, the flow proceeds to step S43; otherwise, the flow proceeds to step S45.

S43, the PDG judges whether the number of tunnels already established in the IKE SA reaches the preset first threshold corresponding to the number of the tunnels established in the IKE SA or not, and if the number of the tunnels does not reach the preset first threshold, the flow proceeds to step S44; otherwise, the flow proceeds to step S45.

S44, the PDG establishes the tunnel for the WLAN UE.

The PDG sends a tunnel establishment response to the WLAN UE, which accepts the tunnel establishment request from the WLAN UE and adds 1 to a counter for the tunnels in the IKE.

S45, the establishment of the tunnel for the WLAN UE is rejected.

In the fourth embodiment, the PDG judges whether the current number of the tunnels already established for the user reaches the corresponding second threshold or not, judges whether the number of the tunnels already established in the IKE SA reaches the preset first threshold corresponding to the number of the tunnels established in the IKE SA or not, and decides whether to accept the tunnel establishment request from the WLAN UE and allocate the tunnel for the WLAN UE or not according to judgment results.

Finally, it should be understood that the above embodiments are only used to explain, but not to limit the technical solution of the present invention. In despite of the detailed description of the present invention with reference to above preferred embodiments, it should be understood that various modifications, changes or equivalent replacements can be made by those skilled in the art without departing from the scope of the present invention and covered in the claims of the present invention.

What is claimed is:

1. A method for establishing a tunnel in a wireless local area network (WLAN), comprising:
    receiving, by a packet data gateway (PDG), a tunnel establishment request initiated by a WLAN terminal for establishing a tunnel in an existing Internet Key Exchange Security Association (IKE SA);
    judging, by the PDG, whether the number of tunnels already established in the IKE SA has reached a first threshold or not, wherein the first threshold is stored in the PDG;
    if the number of tunnels already established in the IKE SA has not reached the first threshold, judging, by the PDG, whether the number of tunnels already established for the WLAN terminal in all existing IKE SA has reached a second threshold or not, wherein the second threshold is stored in the PDG, and
        (a) if the number of tunnels already established for the WLAN terminal in all existing IKE SA has not reached the second threshold, establishing the tunnel for the WLAN terminal; and
        (b) if the number of tunnels already established for the WLAN terminal in all existing IKE SA has reached the second threshold, rejecting the establishment of the tunnel for the WLAN terminal; and
    if the number of tunnels already established in the IKE SA has reached the first threshold, rejecting the establishment of the tunnel for the WLAN terminal.

2. The method according to claim 1, wherein, in judging whether the number of the tunnels already established in the IKE SA has reached the first threshold or not, the number of the tunnels already established in the IKE SA is obtained by counting through a first counter.

3. The method according to claim 1, wherein, in judging whether the number of the tunnels already established for the WLAN terminal in all existing IKE SA has reached the second threshold or not, the number of the tunnels already established for the WLAN terminal in all existing IKE SA is obtained by counting through a second counter.

4. An apparatus for establishing a tunnel in a wireless local area network (WLAN), comprising:
    a receiving unit configured to receive a tunnel establishment request from a WLAN terminal for establishing a tunnel in an existing Internet Key Exchange Security Association (IKE SA);
    a storage unit configured to store a first threshold and a second threshold; and
    a processor configured to judge whether the number of tunnels already established in the IKE SA has reached the first threshold or not, and
        if the number of tunnels already established in the IKE SA has not reached the first threshold, judge whether the number of tunnels already established for the WLAN terminal in all existing IKE SA has reached a second threshold or not, and
            (a) if the number of tunnels already established for the WLAN terminal in all existing IKE SA has not reached the second threshold, establish the tunnel for the WLAN terminal, and
            (b) if the number of tunnels already established for the WLAN terminal in all existing IKE SA has reached the second threshold, reject the establishment of the tunnel for the WLAN terminal, and if the number of tunnels already established in the IKE SA has reached the first threshold, reject the establishment of the tunnel for the WLAN terminal.

5. The apparatus according to claim 4, further comprising:
a first counter, configured to count the number of the tunnels already established in the IKE SA; and
a second counter, configured to count the number of the tunnels already established for the WLAN terminal in all existing IKE SA.

6. The apparatus according to claim 4, wherein the apparatus is a packet data gateway (PDG).

7. An apparatus for establishing a tunnel in a wireless local area network (WLAN), comprising:
a receiving unit configured to receive a tunnel establishment request from a WLAN terminal for establishing a tunnel in an existing Internet Key Exchange Security Association (IKE SA);
a storage unit configured to store a first threshold and a second threshold; and
a processor configured to judge whether the number of tunnels already established for the WLAN terminal in all existing IKE SA has reached a second threshold or not, and if the number of tunnels already established for the WLAN terminal in all existing IKE SA has not reached the second threshold, judge whether the number of tunnels already established in the IKE SA has reached a first threshold or not, and
(a) if the number of tunnels already established in the IKE SA has not reached the first threshold, establish the tunnel for the WLAN terminal, and
(b) if the number of tunnels already established in the IKE SA has reached the first threshold, reject the establishment of the tunnel for the WLAN terminal, and if the number of tunnels already established for the WLAN terminal in all existing IKE SA has reached the second threshold, reject the establishment of the tunnel for the WLAN terminal.

8. The apparatus according to claim 7, further comprising:
a first counter, configured to count the number of the tunnels already established in the IKE SA; and
a second counter, configured to count the number of the tunnels already established for the WLAN terminal in all existing IKE SA.

9. The apparatus according to claim 7, wherein the apparatus is a packet data gateway (PDG).

10. A method for establishing a tunnel in a wireless local area network (WLAN), comprising:
receiving, by a packet data gateway (PDG), a tunnel establishment request initiated by a WLAN terminal for establishing a tunnel in an existing Internet Key Exchange Security Association (IKE SA);
judging, by the PDG, whether the number of tunnels already established for the WLAN terminal in all existing IKE SA has reached a second threshold or not, wherein the second threshold is stored in the PDG;

if the number of tunnels already established for the WLAN terminal in all existing IKE SA has not reached the second threshold, judging, by the PDG, whether the number of tunnels already established in the IKE SA has reached a first threshold or not, wherein the first threshold is stored in the PDG, and
(a) if the number of tunnels already established in the IKE SA has not reached the first threshold, establishing the tunnel for the WLAN terminal, and
(b) if the number of tunnels already established in the IKE SA has reached the first threshold, rejecting the establishment of the tunnel for the WLAN terminal; and if the number of tunnels already established for the WLAN terminal in all existing IKE SA has reached the second threshold, rejecting the establishment of the tunnel for the WLAN terminal.

11. The method according to claim 10, wherein, in judging whether the number of the tunnels already established in the IKE SA has reached the first threshold or not, the number of the tunnels already established in the IKE SA is obtained by counting through a first counter.

12. The method according to claim 10, wherein, in judging whether the number of the tunnels already established for the WLAN terminal in all existing IKE SA has reached the second threshold or not, the number of the tunnels already established for the WLAN terminal in all existing IKE SA is obtained by counting through a second counter.

* * * * *